(12) United States Patent
Cheng

(10) Patent No.: US 11,367,117 B1
(45) Date of Patent: Jun. 21, 2022

(54) ARTIFICIAL INTELLIGENCE SYSTEM FOR GENERATING NETWORK-ACCESSIBLE RECOMMENDATIONS WITH EXPLANATORY METADATA

(71) Applicant: Amazon Technologies, Inc., Seattle, WA (US)

(72) Inventor: Weiwei Cheng, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 773 days.

(21) Appl. No.: 15/688,681

(22) Filed: Aug. 28, 2017

(51) Int. Cl.
*G06Q 30/00* (2012.01)
*G06Q 30/06* (2012.01)
*G10L 13/02* (2013.01)
*G06N 20/00* (2019.01)
*G06F 40/169* (2020.01)

(52) U.S. Cl.
CPC ....... *G06Q 30/0631* (2013.01); *G06F 40/169* (2020.01); *G06N 20/00* (2019.01); *G10L 13/02* (2013.01)

(58) Field of Classification Search
CPC .... G06Q 30/0631; G10L 13/02; G06N 20/00; G06F 40/169
USPC ............................................. 705/26.1–27.2
See application file for complete search history.

(56) References Cited

U.S. PATENT DOCUMENTS

| 7,295,995 | B1 | 11/2007 | Fork et al. | |
| 7,590,562 | B2* | 9/2009 | Stoppelman | G06Q 30/02 705/26.7 |
| 7,783,528 | B2 | 8/2010 | Musgrove et al. | |
| 7,809,601 | B2 | 10/2010 | Shaya et al. | |
| 7,831,439 | B1* | 11/2010 | Bryar | G06Q 10/00 705/1.1 |
| 2002/0161664 | A1* | 10/2002 | Shaya | G06Q 30/02 705/7.31 |
| 2013/0073430 | A1* | 3/2013 | Gallen | G06Q 50/01 705/26.41 |
| 2015/0262286 | A1 | 9/2015 | Cypher et al. | |
| 2019/0114566 | A1 | 4/2019 | Lapierre | |

OTHER PUBLICATIONS

"Who are you shopping for?", downloaded from https://www.amazon.com/gp/gift-finder?ageGroup=adult-neutral&showBubbles=true on Aug. 13, 2017, pp. 1-6.
U.S. Appl. No. 15/474,992, filed Mar. 30, 2017, Szarvas, et al.

* cited by examiner

Primary Examiner — Anand Loharikar
(74) Attorney, Agent, or Firm — Robert C. Kowert; Kowert, Hood, Munyon, Rankin & Goetzel, P.C.

(57) ABSTRACT

At an artificial intelligence system, gifting-related ranking information pertaining to a plurality of items is obtained. Using the ranking information and respective feature sets corresponding to the items, a machine learning model is trained to generate respective gift-suitability scores corresponding to individual items. Based on a gift-suitability score generated by a trained version of the model, a gift-giving recommendation is generated indicating a particular item as a candidate gift. An explanation for the recommendation, expressed in natural language, is provided with the recommendation.

20 Claims, 11 Drawing Sheets

ARTIFICIAL INTELLIGENCE SYSTEM FOR GENERATING NETWORK-ACCESSIBLE RECOMMENDATIONS WITH EXPLANATORY METADATA

BACKGROUND

In recent years, more and more of the items purchased by the general public are being bought online. Some e-retail organizations which sell a variety of items such as electronic devices, books, clothing, household items, and the like may have large inventories comprising millions of items. In many cases, the number of items available, even within a given category such as a particular type of clothing, may be quite large. An almost limitless amount of research and comparison may be possible online when searching for items to purchase, sometimes making it difficult for a potential consumer to select which specific item should be bought for a particular purpose.

This selection problem is even more of an issue when a gift is to be purchased, as the response of the gift receiver to the gift may often have a higher level of emotional significance to a potential gift purchaser than is associated with the purchase of non-gift items. This may be especially true for the many special occasions during a year in which people are expected to purchase gifts—e.g., seasonal holidays, birthdays, days set aside to honor one's parents, and so on. Of course, it may not be straightforward to predict the extent to which a gift receiver is likely to have a positive response to a gift; what constitutes a "good" gift is highly subjective and often varies from person to person. Even for a particular person, the characteristics that may make a given item suitable as a gift may vary over time, or even with the current mood of the person. Furthermore, for a gift purchase to be considered successful, needs of both the gift giver (e.g., budget limits, timing constraints with respect to the delivery of the gift, etc.) and the gift receiver may have to be satisfied.

Many e-retail organizations may attempt to generate recommendations for various types of purchases in order to help with the item selection problem. In many cases, however, generic recommendations by themselves may not be straightforward for potential gift purchasers to interpret, and may therefore not be very convincing. Given some of the difficulties indicated above with regard to identifying items suitable for gifts, automatically recommending items to be purchased as gifts may represent a non-trivial technical challenge.

Figure 1:
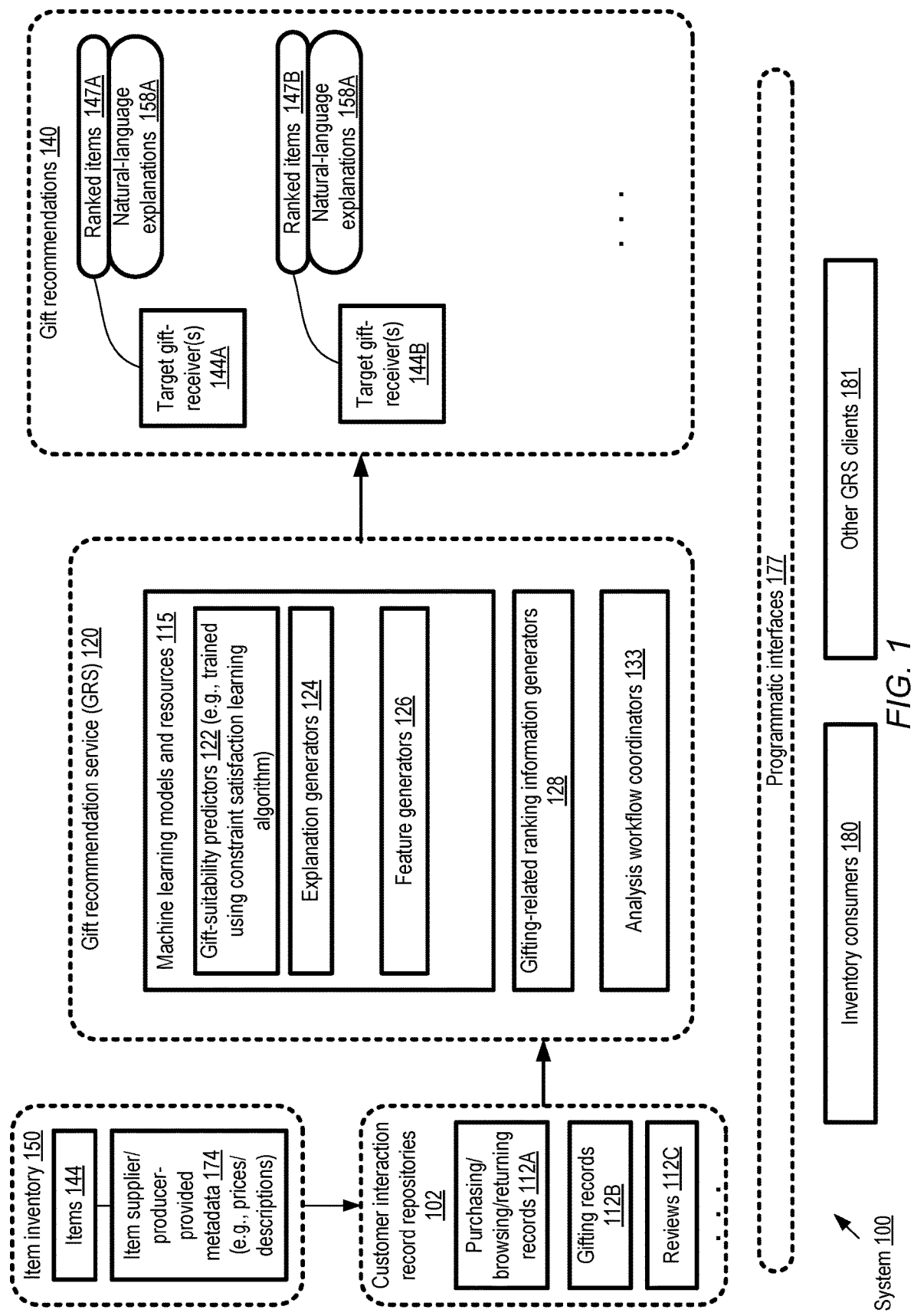
FIG. 1 illustrates an example system environment in which a gift recommendation service may implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for automatically generating recommendations for items to be given as gifts in a data-driven manner, together with natural language explanations for the recommendations, are described. In some embodiments, one or more machine learning models may be employed to generate the recommendations and/or the accompanying explanations. In one embodiment, one or more of the techniques described herein may be implemented at a network-accessible service, e.g., in a provider network or public cloud environment.

According to some embodiments, a collection of items (such as all the items of an inventory or catalog, or some selected subset of the inventory/catalog) to be evaluated as possible gifts may be identified. The gift-related needs or requirements of at least one of two sets of entities may be considered in at least some embodiments: the recipients or targets of the gifts, and the givers or sources of the gifts. A gifting-related ranking (such as a partial order, or a pairwise ordering) or ordered arrangement of numerous items of a catalog or inventory may be obtained in various embodiments, e.g., using records indicating whether individual ones of the items were purchased as a gift or not, and/or using curated gifting advice information that may have been generated for at least a subset of the items. In addition, a respective set of features to be used as input to one or more machine learning models may be generated for the different items in some embodiments, based for example on text metadata associated with the items such as descriptions provided by item producers/suppliers, user-generated reviews, and so on. Using the gifting-related ranking information and the generated features, one or more machine learning models may be trained in some embodiments to generate gift-suitability scores for items. The terms "gift-suitability" and "giftability" may be used interchangeably in some embodiments to refer to the extent to which a given item is estimated to be successful when presented as a gift. In some embodiments, information about the target demographic or group of recipients for which the gift-suitability score is to be generated for an item may be included in the input supplied to the model(s), or otherwise represented in the model(s). In other embodiments, respective versions of the model(s) may be trained for different target/recipient groups.

In various embodiments, based at least in part on the gift-suitability score (generated by the machine learning model(s)) corresponding to a particular item, a gift-giving recommendation indicating the item as a candidate gift may be generated and provided to one or more entities and/or destinations. In at least some embodiments, in addition to the indication that the item is a good candidate for a gift, some reasoning or explanation expressed in natural language may be provided as well. In some such embodiments, for example, the explanations may be extracted from or based at least partly on reviews or other user-generated text content that was collected for the item (and at least in some cases represented in the features generated for the item).

Any of a number of approaches may be taken towards generating the gifting-related ordering or ranking information in different embodiments. In one embodiment, for example, when purchasing an item from an online catalog or e-retailing establishment, a consumer or purchaser may directly or indirectly indicate whether the item is being purchased as a gift. Such direct or indirect indications may be referred to as gifting records in various embodiments. Direct indications may for example include simply marking/labeling the item as a gift, while indirect indications may for example be provided by selecting a gift-wrapping option, choosing a shipping address of a family member or friend to whom gifts have been sent previously, and so on. As a result, at least in those cases in which the purchasers indicate that some item is being purchased with the intention of gifting, a record of the intention may be generated and stored, as well records associated with non-gifting purchases of the item. In some embodiments, for at least some items, a respective gifting-to-purchasing ratio may be computed by, for example, dividing the number of times the item was purchased for gifting in some selected time period, by the total number of times the item was purchased during that time period. A gifting-related ranking or ordering of the items may then be generated based on their gifting-to-purchasing ratios in such embodiments, e.g., under the assumption that the more frequently an item was purchased as a gift in the past, the better suited it is to be recommended as a gift in the future. Note that, as the gifting-to-purchasing ratio at best captures the stated/indicated intention of the purchaser of the item, and does not provide explicit feedback about how much the recipient liked the item (or even if a recipient actually received the item), this ratio may be considered an approximation regarding the potential success of an item as a gift in various embodiments. In some embodiments, additional records collected at the entity from which the items are purchased, such as records of item returns, may be used in combination with the gifting-to-purchasing records to help rank or order items as gifts.

In at least one embodiment, instead of or in addition to using the gifting-to-purchasing ratios directly, one or more machine learning models may be used to obtain the gifting-related ranking for various items. For example, a regression model may be trained to generate gift-suitability ranking scores (using records or metrics of gifting among the input features), and/or a classification model may be trained (using records or metrics of gifting among the input features) to classify items as good/bad gifts or to generate ranking scores. In some embodiments in which curated gifting suggestions or guides have been created for some or all of the items, e.g., by experienced shoppers or employees of the organization selling the items, information contained in such guides may be used to rank items for gift-suitability relative to one another.

Any combination of a number of different techniques may be used to generate the features to be used, along with the gifting-related ranking information, as input for training the prediction models in various embodiments. In some embodiments, user-generated content such as unstructured text reviews, ratings and the like may be used as part of the source for the features, e.g., in combination with text metadata such as descriptions provided by the producers/creators of the items. A set of transformations may be applied to the raw text collections (such as reviews, descriptions etc.) in some embodiments, e.g., including case normalization, stemming, stop word removal and the like, before the features are generated; in other embodiments, at least some such transformations may not be performed. In one embodiment, the counts of the unique unigrams (words, syllables or the like) and/or N-grams (sequences of N successive unigrams) in a given set of reviews or other input text collection may be computed. A feature vector of length L may be generated (where L is the total number of unique unigrams/N-grams) in such embodiments, with each of the L elements being the count of the corresponding unigram or N-gram in the analyzed text. The exact definition of a unigram, the number of different N-gram lengths used, and/or the set of transformations to be used on the raw input text, may all be considered meta-parameters of the overall gift-recommendation algorithm in one embodiment.

In some embodiments, other approaches, such as the use of embedding vectors for text words or word combinations may be taken for feature generation. In one embodiment, individual words of a word collection or dictionary may be mapped to respective high-dimensional vectors (which may be termed embedding vectors) of real numbers using any of various natural language processing (NLP) algorithms, such that words which are semantically similar to one another are represented by relatively nearby points in the high-dimensional vector space. For the purposes of gift recommendations, corresponding to a given set of reviews (or some other text metadata) comprising W distinct words for an item, a vector of W embedding vectors may be used as an input feature for a gift-suitability score prediction model in such an embodiment. In some embodiments, character-level features may be generated from item metadata text, while in other embodiments, phrase or sentence-level features may be used. In one embodiment, multi-instance learning techniques may be used—e.g., individual reviews of a chain or sequence of reviews for an item may be treated as separate but related text collections. In some embodiments, the fact that one review (a text subsection of the overall text collection) was submitted temporally after (rather than before)

another review may be represented as or in a feature. In other embodiments in which reviews may be posted in response to earlier-submitted reviews, the fact that a given review was submitted in response to another review of the item may be represented as or in a feature. Various other techniques for representing text information for items via features may be used in different embodiments. In at least some embodiments, non-text metadata (such as price, size, or other structured metadata) may also be represented in the set of features generated for individual items.

Any of various types of machine learning models may be employed in different embodiments for predicting gift-suitability scores (e.g., for newly-introduced items) using the generated features and ranking information. In some embodiments, a single linear model may be used for predicting the scores used for gift recommendations, and for identifying the text to be used for natural language explanations of the recommendations (e.g., using weights/coefficients assigned to unigrams or N-grams represented in the input features of the linear model). In at least one embodiment, separate models may be used for predicting the gift-suitability scores and the natural language explanations—e.g., a non-linear model such as a neural network-based model may be used for the prediction, while a linear model may be used for the explanations.

Several different types of interfaces may be used to provide the gift recommendations and accompanying explanations in some embodiments. For example, in one embodiment, a network-accessible gift recommendation service may implement one or more programmatic interfaces, such as a web-based console, a graphical user interface, command-line tools and/or a set of application programming interfaces which can be used by clients to submit requests and receive responses. In such an embodiment, a client may submit a gift recommendation request via a programmatic interface and receive a list of one or more candidate items recommended by the service. In some embodiments, individuals or organizations that manage their own inventories or catalogs may wish to improve their own inventories, and such clients may submit requests to the gift recommendation service and receive suggestions for items to be included in (or excluded from) their inventories. In at least one embodiment, a gift recommendation service employing the data-driven approaches indicated above may be used transparently by an e-retailer—e.g., a gift suggestions web page or similar interface may be used to expose the recommendations generated by the service to various potential customers of the e-retailer, without necessarily indicating that a gift-recommendation service is being used. In some embodiments, gift recommendations generated by the service may be provided in non-visual formats—e.g., recommendations for items suitable as gifts may be provided in audio form via a voice-drive personal assistant device. The output of the gift recommendation service may be used in several other ways in some embodiments, e.g., to help organize the contents of seasonal catalogs, to organize advertisement contents, and so on.

Example System Environment

FIG. 1 illustrates an example system environment in which a gift recommendation service may implemented, according to at least some embodiments. As shown, in system 100, a gift recommendation service 120 may include, among other components and artifacts, one or more analysis workflow coordinators 133, gifting-related ranking information generators 128, and a set of machine learning models and resources 115 in the depicted embodiment. The machine learning models and resources 115 may, for example, include one or more feature generators 126, gift-suitability predictors 122, and/or explanation generators 124 in some embodiments. Individual ones of the analysis workflow coordinators 133, ranking information generators 128, feature generators 126, predictors 122, and/or explanation generators 124 may be implemented using some combination of hardware and/or software at one or more computing devices in various embodiments. In some embodiments, some of the elements 133, 128, 126, 124 or 122 shown as logically distinct within the gift recommendation service 120 in FIG. 1 may not necessarily be implemented as separate entities—e.g., one or more of the elements may be instantiated within a single computing device, or a single machine learning model may be used for both sift-suitability predictions and explanations.

In the depicted embodiment, the gift recommendation service (GRS) 120 may have access to several different data sources which collectively may be used to train and run machine learning models to be used to generate recommendations and accompanying explanations. Gift-related recommendations may be generated for a set of items 144 of an inventory or catalog 150. For at least some of the items, various kinds of item supplier/producer provided metadata 174 may be available as one of the data sources used by the GRS. Such metadata may include, for example, descriptions, sizes, prices, and the like in various embodiments; some of the metadata elements may be in the form of unstructured or partially structured text, while other elements may be available as structured text or non-text data.

Corresponding to at least some subset of the items of the inventory, a number of customer interaction records may be stored in the depicted embodiment, e.g., in one or more repositories 102, by the entity responsible for managing/selling the items 144. Such repositories 102 may contain, among other kinds of records, records 112A of purchases, browsing history, or returns regarding the items 144, records 112B indicating labeling of items purchased as gifts, and/or reviews 112C generated by item purchasers or other parties in various embodiments. In some embodiments, the interaction records 112 (e.g., 112A, 112B and/or 112C) may all be considered part of item metadata and may be stored in a shared repository item supplier/producer-provided metadata 174. Other data sources, not shown in FIG. 1 may also or instead be used for gift recommendation generation in some embodiments, such as curated gift guides for various segments of the potential item customer population.

In some embodiments, the available interaction records may be used to generate gifting-related ranking or ordinal information. For example, ranking information generators 128 may determine, for a given item 144 and some selected time interval, the total number of times the item was marked/labeled as a gift during the purchase process (e.g., using gifting records 112B), and the total number of times the item was purchased (e.g., using records 112A). From those two quantities, the gifting-to-purchasing ratio may be computed for various items, and this ratio may be used to rank the items, with higher gifting-to-purchasing ratios assumed to indicate items more suitable as gifts than lower gifting-to-purchasing ratio items. In at least one embodiment, instead of (or in addition to) using the gifting-to-purchasing ratios directly as the evidence of gift-suitability, one or more machine learning models (e.g., regression or classification models) may be trained to generate scores which can be used to rank items relative to one another regarding their appropriateness for use as gifts.

From the set of available information about the items 144, including for example one or more elements of metadata 174 and/or user-generated reviews 112C, a respective set of features to be used together with the ranking information as input to the gift-suitability predictors 122 may be produced by feature generators 126 in the depicted embodiment. A number of different features representing text and/or numerical or categorical information about the items 144 may be generated in different embodiments. In some embodiments, for example, N-gram counts for various N-grams encountered in the text metadata and/or reviews may be utilized as features, or embedding vectors corresponding to the words in the metadata or reviews may be used as features. In one embodiment, instead of using word-level or word-based features, character-based, part-of-speech-based or sentence-based features may be generated. Using the features generated, and the ranking information, one or more gift-suitability predictor models 122 may be trained to generate respective gift-suitability scores for individual items in the depicted embodiment. In one implementation, for example, a gift-suitability score may comprise a real number between 0 and 1, with higher values of the score indicating greater anticipated suitability as a gift than lower values. In at least some embodiments, a constraint satisfaction learning algorithm may be employed for training gift-suitability predictors 122, as discussed below in further detail. In some embodiments, the same model or models that are used to generate the gift-suitability predictions may also be used for generating explanations (e.g., by identifying, for any given recommended item, portions of corresponding reviews 112C and/or metadata 174 which can provide meaningful justifications in natural language for the recommendations).

The output gift recommendations 140 produced by the GRS 120 in the depicted embodiment may comprise, for example, respective sets of one or more ranked items 147 (e.g., items 147A or 147A) which are recommended as candidate gifts for one or more target gift receivers 144 (e.g., gift receivers 144A or 144B). The recommendations for the individual gift candidate items may also comprise natural language explanations 158 (e.g., explanations 158A for items 147A which are recommended as gifts for gift receivers 144A, and explanations 158B for items 147B which are recommended as gifts for gift receivers 144B). In different embodiments, the granularity at which recommendations are generated may differ—e.g., in some cases, gifts may be recommended at the granularity of fairly large groups (e.g., "children between 5-10 years old"), while in other cases, it may be possible to generate gift recommendations specific to much smaller groups (e.g., "adults between 25 and 30 living in city C") or even individuals. The number of items indicated in the recommendation may vary as well in some embodiments—e.g., only the top three candidate gift items may be identified for a given target gift recipient set 144 in some embodiments, while a list of ten or twenty gifts may be generated for a target gift recipient set 144 in other embodiments.

In some embodiments, the GRS 120 may implement one or more programmatic interfaces 177, such as web-based consoles, graphical user interfaces, and the like. Inventory consumers 180 may submit programmatic requests for gift recommendations via the interfaces 177, and receive the responses generated by the GRS using the interfaces. Other GRS clients 181, such as business entities that wish to optimize their own inventories to increase sales of items as gifts, may also use the GRS's programmatic interfaces 177 in various embodiments. In at least some embodiments, the GRS 120 may form a subcomponent of a web-based retailing site—e.g., a shopping site which has gift-guide web pages (similar in concept to the example web page shown in FIG. 2) whose content is generated with the help of the GRS.

Example Constraint Satisfaction Methodology

In at least one embodiment, a constraint satisfaction methodology which uses an algorithm similar to Algorithm 1 outlined below may be employed at a gift recommendation service to learn weights to be assigned to item features to predict gift-suitability scores. In Algorithm 1, ordinal information regarding the items' suitability as gifts, obtained for example using the kinds of gifting-to-purchasing ratios discussed above, may be employed. In particular, constraints in the form of pairwise comparisons among items may be considered. In one example scenario, consider two items $x_1$ and $x_2$ of an inventory. If $x_1$ and $x_2$ were each purchased (during some selected time interval) 1000 times, and $x_1$ was gifted 200 times out of the 1000 purchases, while $x_2$ was gifted 100 times out of the 1000 purchases, one may assert that in terms of giftability or gift-suitability, $x_1$ is better than $x_2$ (which may be expressed using the notation $x_1 > x_2$). Note that this does not necessarily imply subjective evaluations such as that $x_1$ is a "good" gift while $x_2$ is a "bad" gift; the gifting-to-purchasing ratio is simply an approximation regarding suitability of the items as gifts, made based on the available data. Many such pairwise constraints may be generated from the purchasing and gifting data available in some embodiments. The job of a learning algorithm similar to Algorithm 1 in various embodiments is to find a model (e.g., in the case of some model categories, the specific weights or coefficients to be assigned to various input features) that satisfies the constraints as much as possible. Note that the algorithm is not limited to a particular type of model—e.g., linear models, non-linear models such as neural network models and the like may all be trained in different embodiments using the constraint satisfaction methodology shown.

---

Algorithm 1: Constraint Satisfaction Learning with Pairwise Comparisons

Require: a fine set of items $\mathcal{X}$; a finite set of pairwise comparisons $x_i \succ x_j$, with $(x_i, x_j) \in (\mathcal{X} \times \mathcal{X})$
Ensure: the model parameter w of a utility function f(.;w), where
    $f(x_i) > f(x_j)$ implies $x_i \succ x_j$
1: initialize w
2: repeat
3:     for each $x_i \succ x_j$ do
4:         if $f(x_i) <= f(x_j)$ then
5:             modify w such that $f(x_i)$ increases and $f(x_j)$ decreases
6:         end if
7:     end for
8: until convergence criteria are met
9: return f(.;w)

---

In one embodiment, f(.;w) may be a linear function. In embodiments in which $x_i$ is represented by a feature vector $(x_i^{(1)}, \ldots, x_i^{(n)}) \in \mathbb{R}^n$, we have $f(x_i) = w^T x_i$. In such an embodiment, one example concrete implementation of line 5 of Algorithm 1 may comprise:

$$w \leftarrow w + (x_i - x_j)$$

where + and − are vector addition and difference respectively.

In some embodiments, an item $x_i$ may, for example, be represented by features derived from a set of user-generated reviews $r = \{r_1, r_2, \ldots, r_k\}$ of the item. A mapping from r to x (i.e., $\{r_1, r_2, \ldots, r_k\} \rightarrow (x_i^{(1)}, \ldots, x_i^{(n)})$) may be identified in such an embodiment in order to utilize Algorithm 1. In one simple implementation, unigrams and bi-grams of all the reviews available for a given item, combined or concatenated, may be used as features. For example, an integer-valued feature vector such as (0, 11, 0, . . . , 132, 0) may be used to represent a particular item, where an individual value in the vector corresponds to the number of times a particular unigram or bi-gram appears. Other feature generation techniques may be used in different embodiments. In at least some embodiments, constraint satisfaction algorithms similar to Algorithm 1 may not necessarily be employed.

Gift Suggestions Web Page Example

Figure 2:
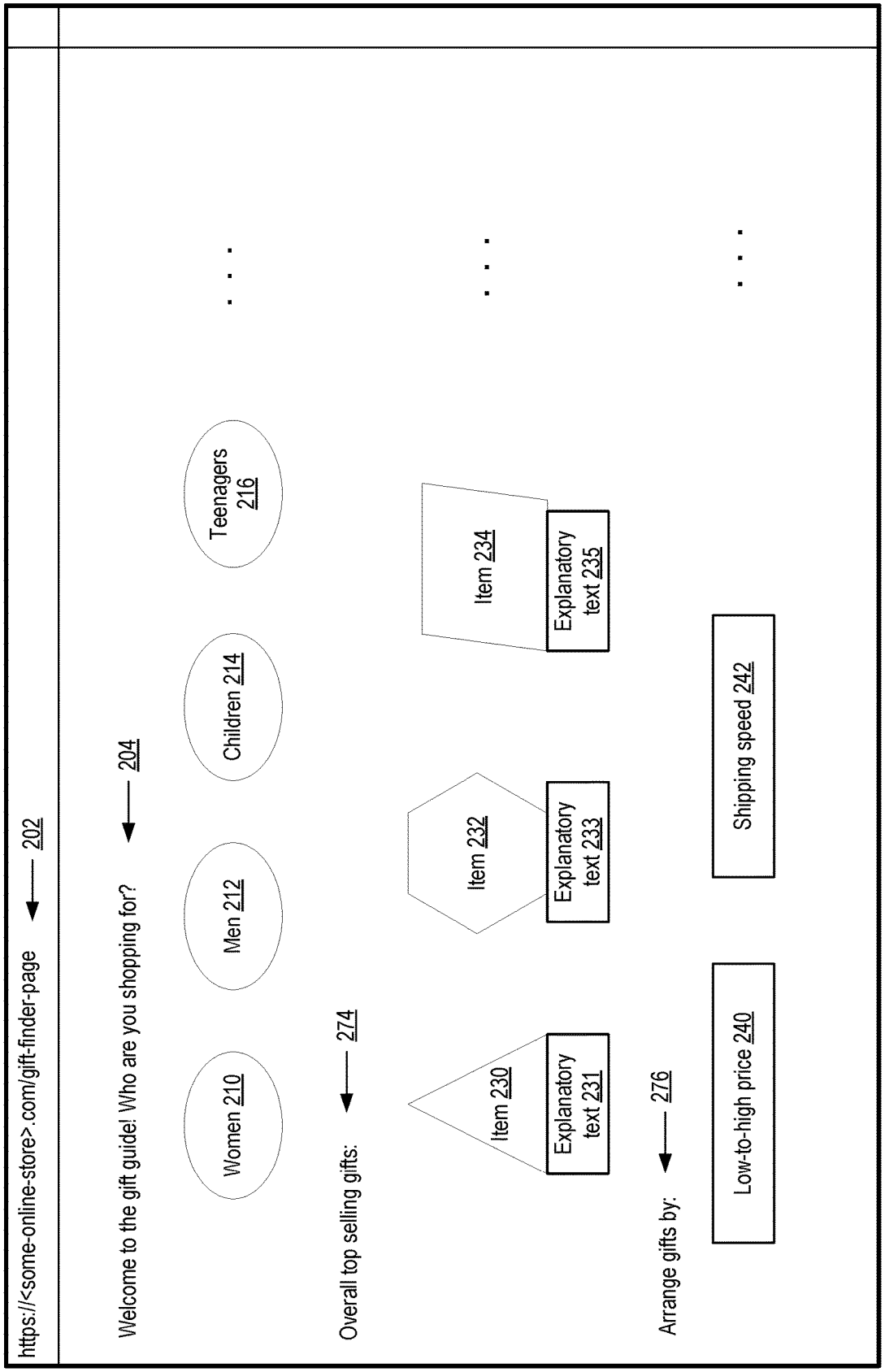
FIG. 2 illustrates an example web page interface which may be used to recommend gifts, identified using a gift recommendation service, for various categories of gift recipients, according to at least some embodiments.

FIG. 2 illustrates an example web page interface which may be used to recommend gifts, identified using a gift recommendation service, for various categories of gift recipients, according to at least some embodiments. In the depicted embodiment, an e-retail organization which enables consumers to order various types of items of an inventory may facilitate the process of selecting gifts by providing one or more "gift finder" web pages, such as gift finder web page 201.

When a potential item purchaser or customer arrives at the gift finder web page 201, e.g., as a result of clicking on an HTML link or entering the HTTP address 201, the message 204 may invite the purchaser to select from a set of gift-recipient categories in the depicted embodiment, such as "Women" 210, "Men" 212, "Children" 214, "Teenagers" 216 and so on. If/when the potential customer clicks on one of the categories, choices of additional sub-categories may be made available in some embodiments—e.g., the "Children" category may be subdivided by age ranges. For each of the categories or sub-categories, a set of gift suggestions may have been determined using the machine learning techniques discussed above in the depicted embodiment. Explanations/justifications for the recommendations expressed in natural language may also be provided for individual items in some embodiments.

In addition to allowing potential item purchasers to narrow down their gift searches by the recipient categories and sub-categories, in the depicted embodiment the potential item purchasers may also be able to indicate other types of preferences regarding how the gift candidate items should be arranged. As indicated in the "arrange gifts by" section 276 of the page, the gift candidates may be ordered by price (if the customer clicks on the low-to-high price option 240) or based on how quickly the items can be shipped (if the customer clicks on the shipping speed option 242). Prior to displaying the list of candidate gifts identified for the purchaser using the machine learning modes(s), the candidate gifts may be sorted based on the criteria indicated by the purchaser in various embodiments.

In at least some embodiments, a gift finder web page 201 may also include a display of images of the overall top-selling gifts 274, such as item 230, 232 and 234 (e.g., together with respective explanatory text 231, 233 and/or 235). Including such a list may further simplify the task of those potential item purchasers who want to choose a popular or trendy gift, for example, without spending much time researching. As discussed below in further detail in the context of FIG. 8, other types of interfaces may be used to provide output of a gift recommendation service in some embodiments.

Gifting-Related Ranking Information

Figure 3:
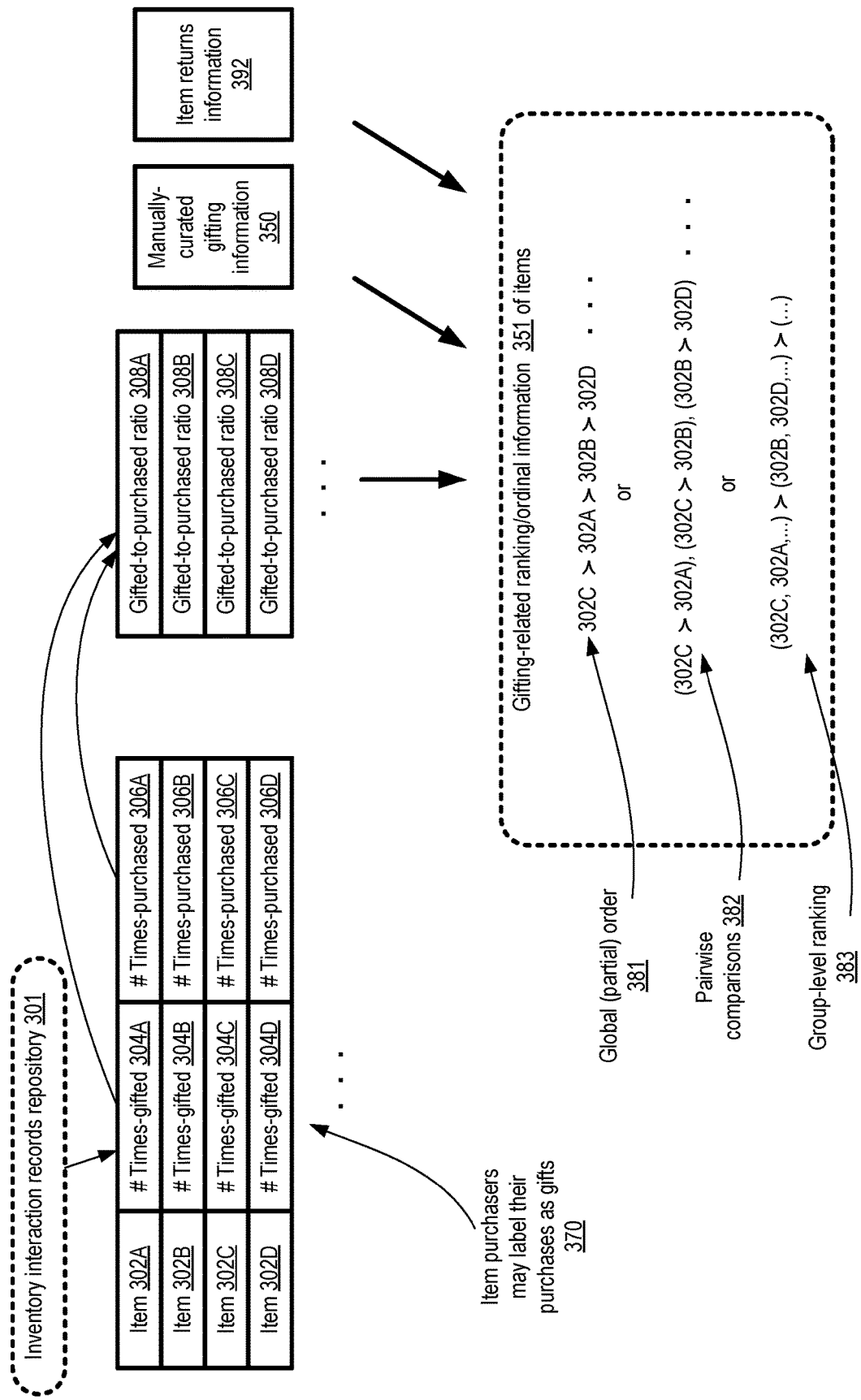
FIG. 3 illustrates examples of techniques which may be used to obtain gifting-related ranking information for items, according to at least some embodiments.

FIG. 3 illustrates examples of techniques which may be used to obtain gifting-related ranking information for items, according to at least some embodiments. As discussed above, in various embodiments such ranking or ordinal information may be used as input to a machine learning algorithm or model for generating gift-suitability scores.

In the depicted embodiment, any of several sources of data may be used to obtain gifting-related ranking or ordinal information 351 for a set of items 302 of an inventory: the labelling 370 of purchases as gifts by the purchasers, manually-curated gifting information 350, and/or item returns information 392. Inventory interaction records repository 301 (e.g., comprising log records of various customer purchases from an e-retailer's web site) may be examined to determine, for a given item such as 302A-302D, the number of times 304 (e.g., 304A-304D) that the item was purchased as a gift, and the total number of times 306 (e.g., 306A-306D) that the item was purchased. A recent time window may be selected in some embodiments, for example N weeks or months prior to the time that the gift recommending models are trained, and the counts 304 and 306 may be determined for that time window. From the times-gifted count and the times-purchased count, the gifted-to-purchased ratio 308 (e.g., 308A-308D) for various items may be computed and used to generate the ranking information 351. In some embodiments, at least for some sets of items or some sets of gift recipient categories, manually-curated gifting information 350 (e.g., consisting of classes of items designated as good gifts for various target recipients) may also or instead be used. In at least one embodiment, item returns information 392 (such as records indicating how often an item was returned after it was purchased) may be used if available (e.g., in combination with the gifted-to-purchased ratio and/or manually-curated gifting information) for obtaining ranking information 351. For example, if an item was purchased 1000 times as a gift, but the item was subsequently returned 800 times by the gift recipients, the relatively high ratio of the number of times it was returned to the number of times it was purchased may lower the item's gifting-related ranking.

The manner in which different items are ranked relative to one another may differ in various embodiments, e.g., depending on the needs of the training algorithm being used for the machine learning model(s) for gift-suitability prediction. In some embodiments, a global partial order 381 may be used, in which all the items being considered are arranged relative to one another. In other embodiments, as when an algorithm similar to Algorithm 1 is employed, pairwise comparisons 382 may be used. In one embodiment, group-level rankings 383 may be employed, e.g., instead of or in addition to item-level rankings.

Feature Generation

Figure 4:
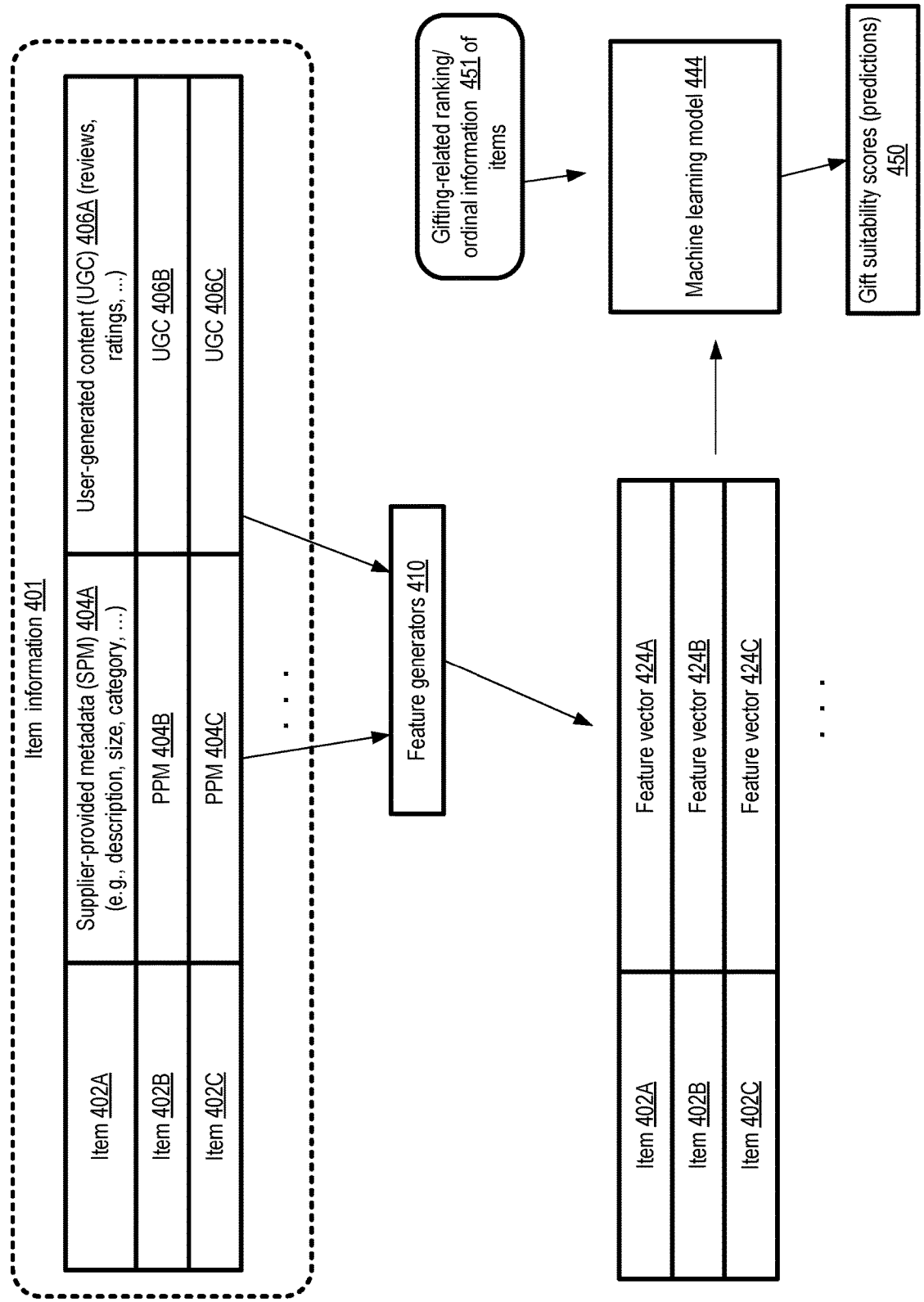
FIG. 4 illustrates example sources from which item features may be generated to train a machine learning model to generate gift suitability predictions, according to at least some embodiments.

FIG. 4 illustrates example sources from which item features may be generated to train a machine learning model to generate gift suitability predictions, according to at least some embodiments. In the depicted embodiment, at least two kinds of information 401 pertaining to various items 402 (e.g., 402A-402C) of an inventory may be used to generate features: a respective set of supplier-provided metadata (SPM) 404 (e.g., 404A-404C) and some amount of user-generated content (UGC) 406 (g., 406A-406C). The supplier-provided metadata for a given item may include, for example, a text description of the item, one or more item categories, size, price etc. in various embodiments. User-generated content 406 may include, for example, reviews, ratings and the like. The SPM 404 and/or the UGC 406 may comprise at least some unstructured text in various embodiments.

From the SPM 404 and the UGC 406, feature vectors 424 (e.g., 424A-424C) may be produced by feature generators 410 of the gift recommendation service in various embodiments. Various types of features which may be generated from text input are discussed below in further detail. A machine learning model 444 may be trained using the feature vectors 424 and gifting related information 452 to generate predicted gift suitability scores 450 for various items (e.g., items which were not part of the training data).

Figure 5:
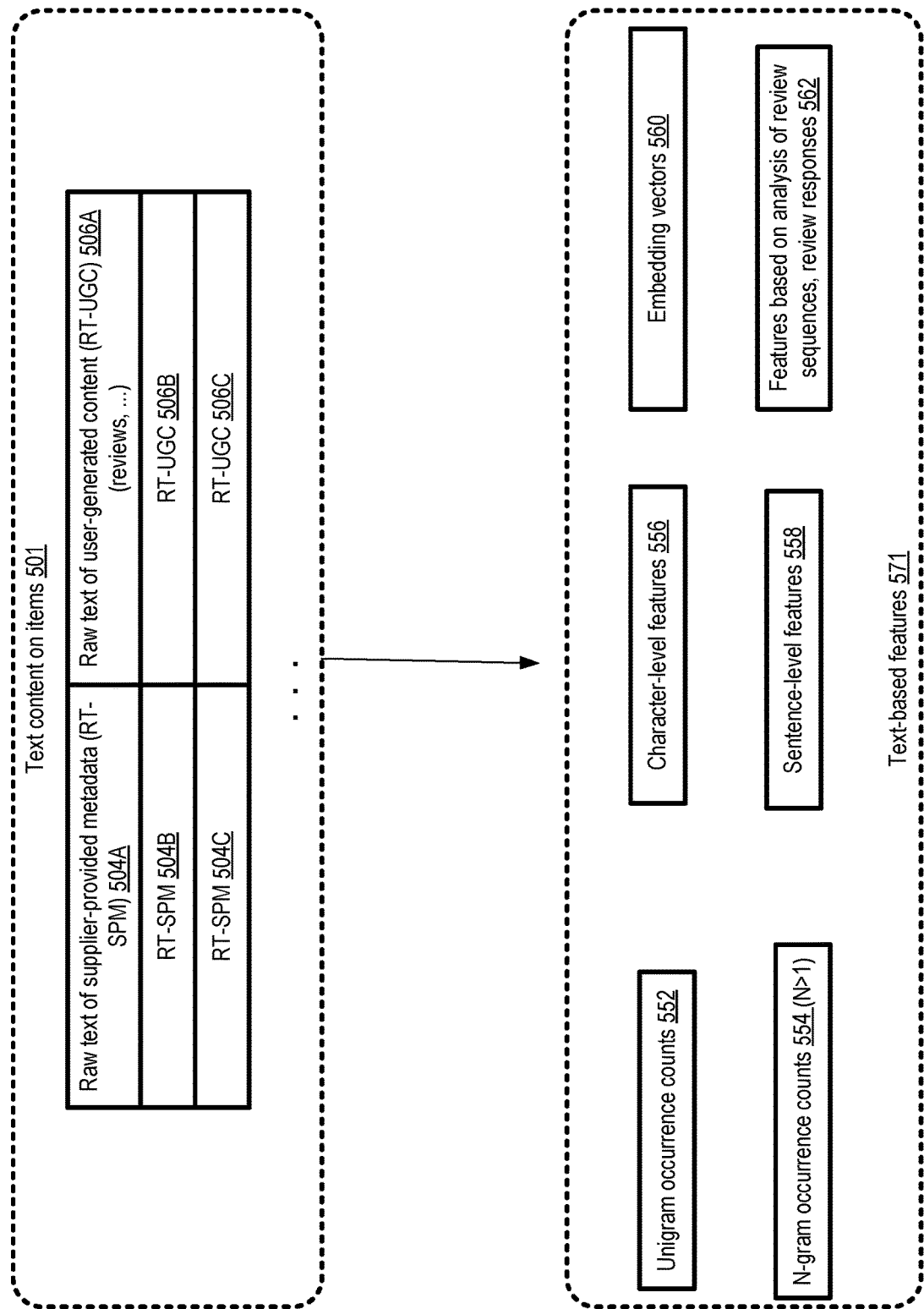
FIG. 5 illustrates examples of features which may be generated from text information about items, according to at least some embodiments.

FIG. 5 illustrates examples of features which may be generated from text information about items, according to at least some embodiments. As shown, the available text content on items 501 may comprise raw text of item supplier-provided metadata (RT-SPM) 504 (such as RT-SPM 504A-504C for respective items), as well as raw text of user-generated content (RT-UGC) 506 (such as RT-UGC 506A-506C).

From the raw text available, a number of different kinds of text-based features 571 may be generated for use as input to machine learning models, e.g., during the training phases of the models and/or after the models have been trained. In some embodiments, as mentioned earlier, unigram occurrence counts 552 (a vector whose elements respectively indicate the number of times a given unigram occurs in the input text records) and/or N-gram occurrence counts 554 (with some selected value of N greater than 1) may be used as features. In other embodiments, character-level features 556 may be used (in which, for example, the probability of an item being suitable for gifting may be based on the predicted sequences of successive characters). In at least one embodiment, sentence-level features 558 may be used—e.g., a semantic interpretation of the input text at the level of whole sentences (or groups of text tokens as close to whole sentences as the input text contains, since the raw text may not necessarily comprise fully grammatical sentences) may be attempted.

In one embodiment, individual words of some selected collection or dictionary may be mapped, e.g., using neural-network based models, to a respective high-dimensional vector of real numbers. The values learned for the elements of the vectors, which may be termed embedding vectors 560, may be such that the vectors for words with similar semantics are typically closer (e.g., using Euclidean distance metrics) to each other in the high-dimensional vector space than the vectors for words which are semantically very different from one another. In scenarios in which embedding vectors 560 are employed, a feature set for a given collection of text may comprise a vector of high-dimensional vectors.

In at least some embodiments, a number of different reviews or other logical groups of text tokens may be available for a given item—e.g., some items may have multiple reviews submitted by item users at different points in time, and some of the reviews may themselves refer to earlier reviews. One reviewer may, for example, submit a review R1 on date D1 for an item X1, while another reviewer may submit a review R2 for X1 at date (D1+delta), either endorsing the views of the earlier reviewer, or opposing the views of the earlier reviewer. In some embodiments, multiple reviews and/or other raw text information available may in effect be treated as one combined collection of text for the purposes of feature generation. In other embodiments, the sequence in which respective reviews were submitted, and/or the fact that some reviews may have been in some sense responding to earlier reviews, may be taken into account when generating at least some item features 562. Techniques other than those shown in FIG. 6 may be used in various embodiments for generating text-based features. In some embodiments, at least some of the kinds of features shown in FIG. 5 may not be employed, while in other embodiments multiple ones of the techniques indicated may be employed together.

Natural Language Explanations for Gift Recommendations

Figure 6:
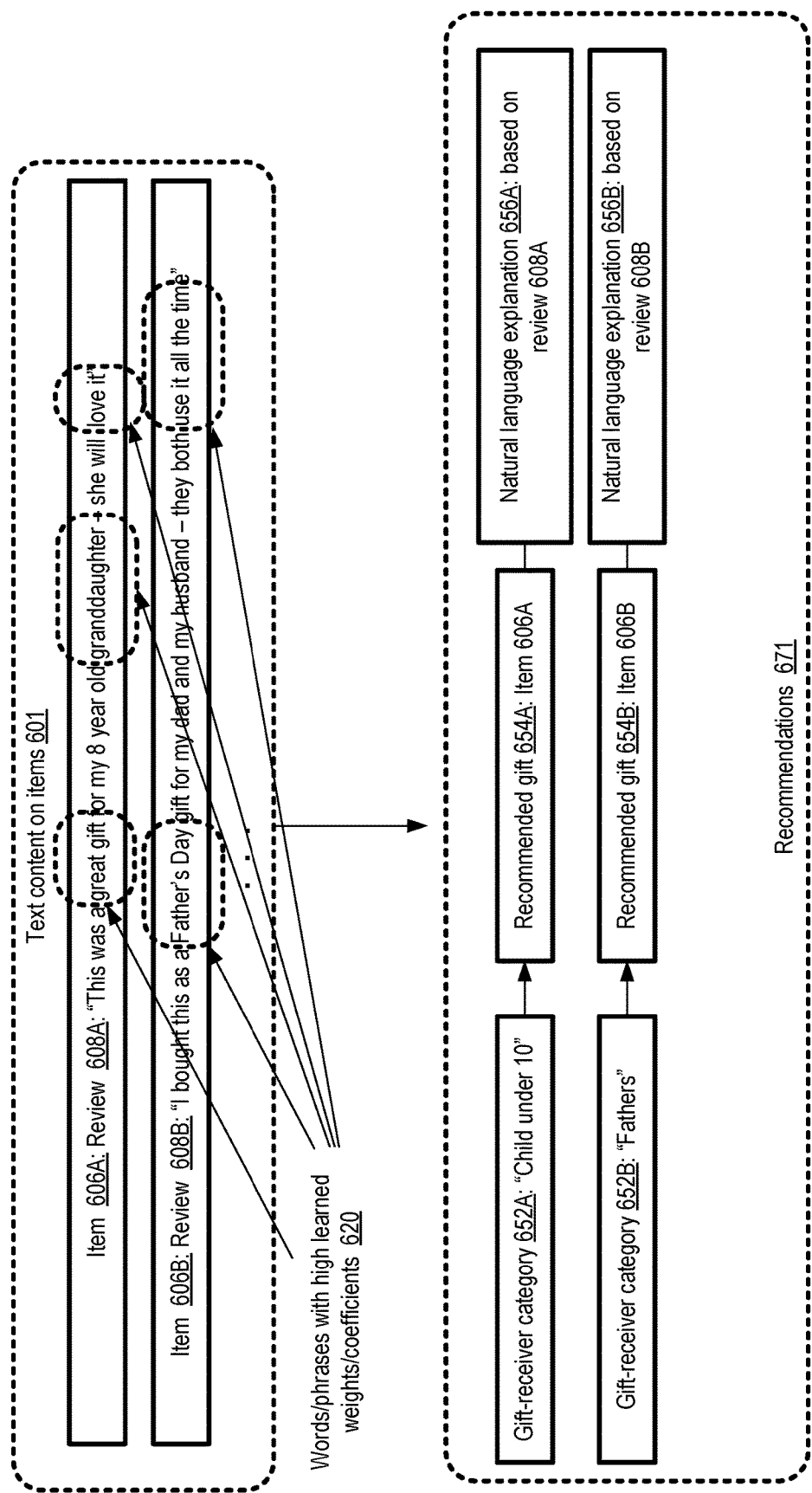
FIG. 6 illustrates examples of the use of user-generated content to provide natural language explanations for gift recommendations, according to at least some embodiments.

FIG. 6 illustrates examples of the use of user-generated content to provide natural language explanations for gift recommendations, according to at least some embodiments. In the example scenario shown, user-generated reviews 608A and 608B may be among the text content available on a set of items 601. Review 608A, for an item 606A, may include the words/phrases "great gift", "granddaughter" and "love it", as shown, while review 608B for an item 606B may comprise the words/phrases "Father's Day" and "use it all the time". In the process of training the model(s) used for generating gift-suitability scores for the items, respective weights or coefficients may be learned for the different words/phrases in the depicted embodiment. The weights or coefficients learned for the example words or phrases 620 may be higher than those of other words in the reviews in the depicted embodiment.

In at least some embodiments, such words or phrases (whose presence in reviews is correlated with higher gift-suitability scores) may be used when providing natural language explanations or justifications for gift recommendations. For example, in the depicted embodiment, the recommendations 671 generated using machine learning models of the kind described earlier may include item 606A and item 606B for respective gift-receiver categories 652A and 652B. For gift-receiver category 652A (children under the age of ten years), recommendation 654A may indicate item 606A as a good candidate for a gift, and may provide a natural language explanation 656A based at least in part on review 608A. Similarly, for gift-receiver category 652B (fathers), recommendation 654B may indicate item 606B as a good candidate for a gift, and may provide a natural language explanation 656B based at least in part on review 608B. It is noted that in some embodiments an explanation 656 may not necessarily correspond exactly to the text contained in the review 608 or other raw text information available on the item being recommended—instead, for example, some of the raw text words may be eliminated or modified (e.g., to avoid disclosing personal information of the reviewer) when presenting the explanation. In at least some embodiments, non-text metadata (such as information about price, size, etc. of an item relative to others) may be included in the set of data from which one or more recommendation explanations are generated.

Modeling Approaches

Figure 7:
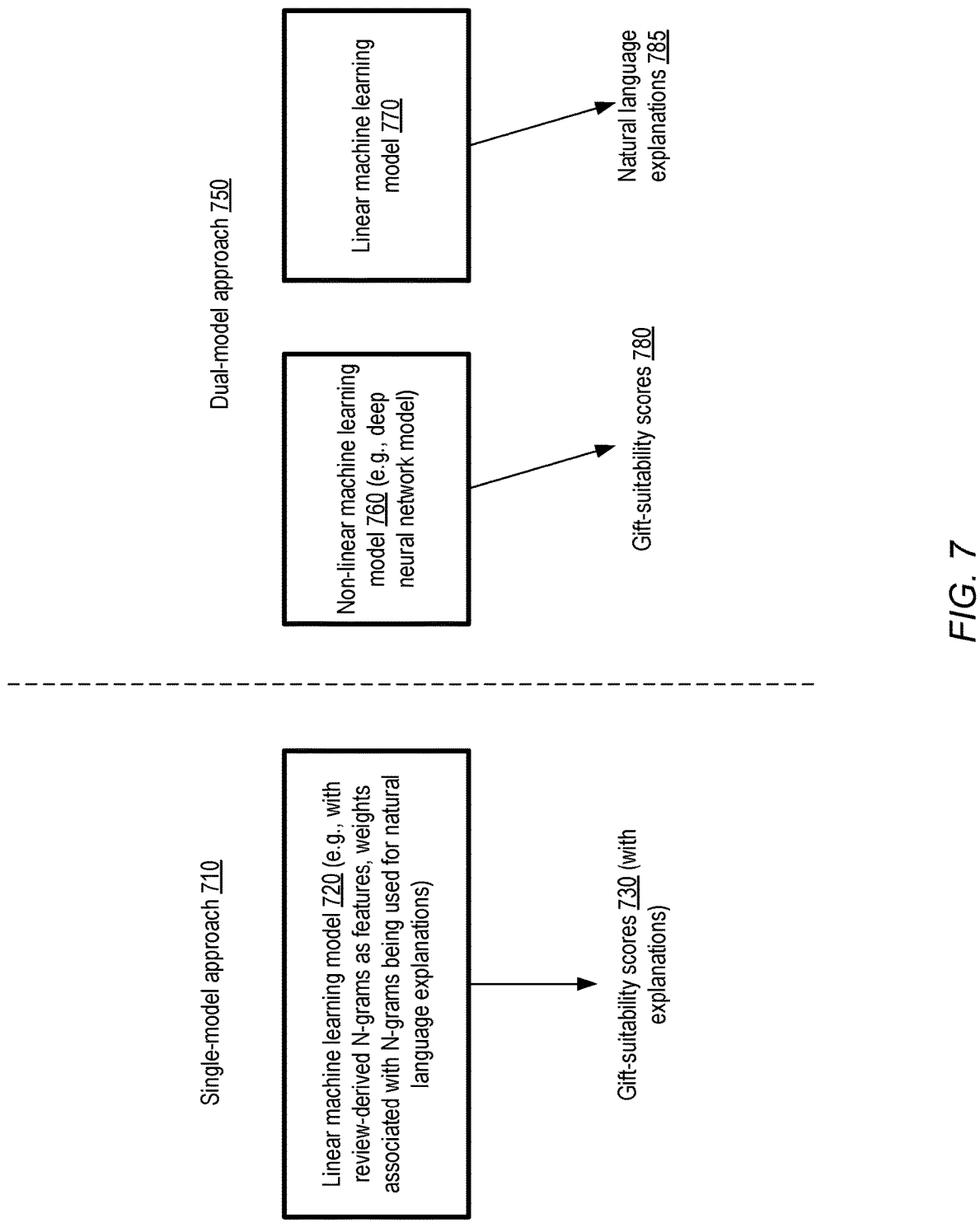
FIG. 7 illustrates single-model and dual-model approaches towards generating gift recommendations with accompanying explanations, according to at least some embodiments.

As mentioned earlier, the machine learning model used for generating gift-suitability scores used for recommendations may not necessarily be the same model that is used to generate explanations for the recommendations. FIG. 7 illustrates single-model and dual-model approaches towards generating gift recommendations with accompanying explanations, according to at least some embodiments.

As shown, in one example of a single-model approach 710, a linear machine learning model 720 may be used to generate gift-suitability scores 730 with accompanying explanations. In one such linear model, the features used for the model may comprise, for example, review-derived N-grams, and the learned weights associated with the N-grams may be used to generate the natural language explanations.

In at least some embodiments, the task of generating gift-suitability scores may not necessarily be tightly coupled with the task of generating explanations for gift recommendations; therefore, different models may be used for the two tasks. In one example of a dual-model approach 750, a non-linear machine learning model 760 may be used to generate gift-suitability scores 780 for various items, and a linear model 770 may be used to generate the natural language explanations. In some embodiments, a deep neural network model may be used to generate the gift-suitability scores 780 (e.g., based on a determination that the non-linear model provides better or more accurate gift-suitability scores than a linear model). In some embodiments, two distinct linear models may be used in the dual-model approach, or two distinct non-linear models may be used. In at least one embodiment, an ensemble comprising multiple models may be used for gift-suitability scores alone, explanations alone, or both scores and explanations.

In various embodiments, implementations of each of the models may, for example, include memory for storing input values and parameters and computer-executable instructions for an initial set of computations on the input values. In some embodiments, e.g., when neural network-based models are used, intermediary layers of the model may include memory storing computer-executable instructions and/or data for manipulating the results of the initial computations and determining values to be transmitted to an output layer. The output layer may in turn include memory and/or computer-executable instructions for generating and/or storing output values such as the gift-suitability scores and/or natural language explanation text. Any of a number of types of data structures may be used for storing data and/or implementing the algorithm logic, e.g., including various tree-based structures as well as data structures optimized for storing matrices, vectors, arrays, hash tables and the like.

Programmatic Interactions

Figure 8:
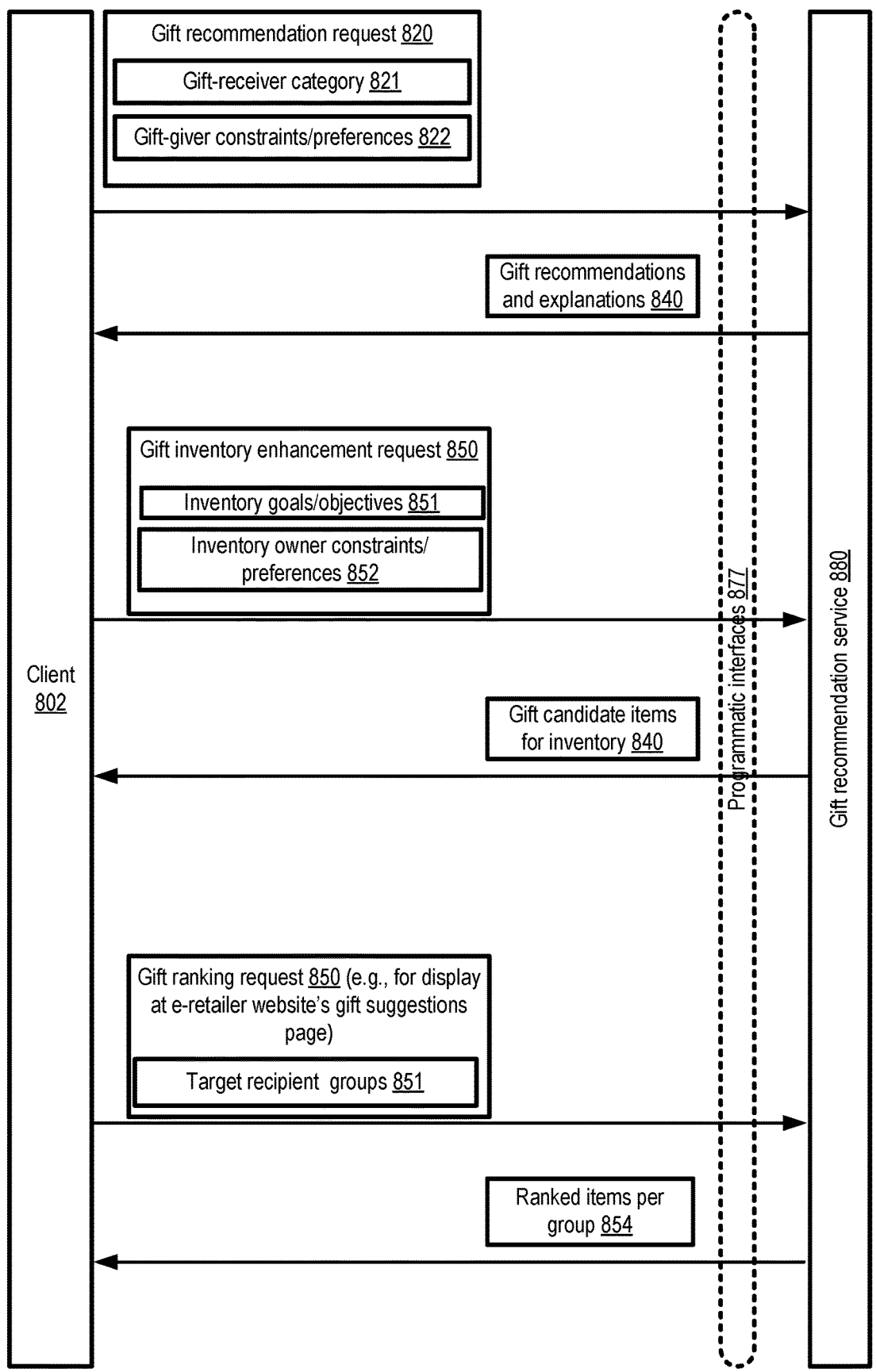
FIG. 8 illustrates aspects of example programmatic interactions between clients and a gift recommendation service, according to at least some embodiments.

As mentioned earlier, a gift-recommendation service may be used by a variety of clients with respective types of goals or objectives. In at least some embodiments, one or more sets of programmatic interfaces may be implemented by the service to enable clients to submit requests based on their goals, and to receive corresponding responses. FIG. 8 illustrates aspects of example programmatic interactions between clients and a gift recommendation service, according to at least some embodiments. In the depicted embodiment, programmatic interfaces 877 implemented by gift recommendation service 880 may comprise for example, one or more web-based consoles or web pages, graphical user interfaces, command-line tools or a set of application programming interfaces. In some embodiments, distinct sets of programmatic interfaces may be implemented for respective types of clients.

In some embodiments, clients 802 may comprise individuals interested in purchasing a gift for someone, and such clients may submit programmatic gift recommendation requests 820 to service 880. A given recommendation request 820's parameters may include, for example, an indication of the intended recipient(s) such as a gift-receiver category 821, and/or constraints/preferences 822 of the gift-giver (such as acceptable price ranges, acceptable shipment dates, and so on). In response to a request 820, the service 880 may in some embodiments examine the results obtained from trained machine learning models of the kind described above to obtain a ranking of the available items, and provide a set of gift recommendations and explanations 840. In some embodiments, a current set of available items (which may change over time) may be ranked periodically (e.g., once every T hours) for gift-suitability, and responses to gift recommendation requests may be generated without re-running the models. In other embodiments, the models may be re-executed in response to at least some requests.

In at least one embodiment, another category of clients of the gift recommendation service may have their own retail establishments (e.g., either a physical establishment or a web-based store), and may wish to enhanced their own gift item inventory. Such a client 802 may submit an inventory enhancement request 850, indicating goals and objectives 851 for their inventory and their constraints and preferences 852 (e.g., acceptable sizes/prices of items in their inventory). The goals/objectives may, for example, comprise the logical equivalent of "I would like to increase sales of gift books for young adults" or the like. In response to such a request, the gift-suitability scores generated by the models of the service may be used to provide a list of gift candidate items 840 for the requester in the depicted embodiment.

In various embodiments, the gift recommendation service 880 may be implemented as an internal service by an e-retailer, and a client 802 may comprise an employee or department of the e-retailer responsible for increasing gift-related sales. A gift ranking request 850 may be submitted by such a client, indicating one or more targeted groups 851 of gift recipients. In response, using the results of machine learning models of the kind described above, ranked items per group 854 may be provided to the client by service 880. Such rankings may be used, for example, to populate gift suggestions web pages similar to the web page shown in FIG. 2. In some embodiments, the natural language explanations for gift recommendations may be stored as part of item metadata, which can be presented to potential item purchasers as and when needed.

Provider Network Environment

Figure 9:
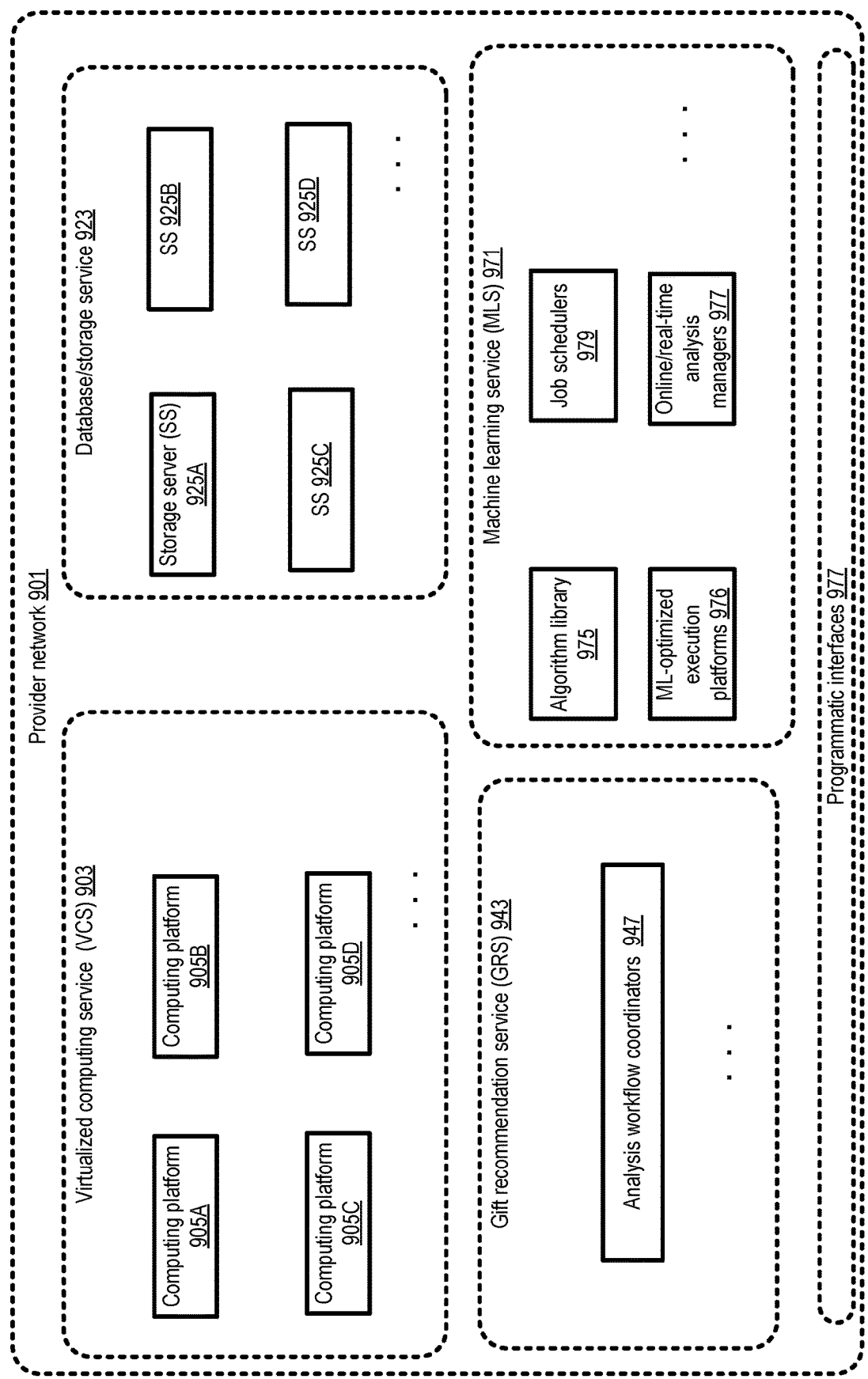
FIG. 9 illustrates a provider network environment at which a gift recommendation service may be implemented, according to at least some embodiments.

In some embodiments, the techniques discussed above for generating gift recommendations may be implemented using resources of one or more services of a provider network. FIG. 9 illustrates a provider network environment at which a gift recommendation service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 901 may comprise resources used to implement a plurality of services, including for example a virtual computing service 903, a database or storage service 923, a machine learning service 971 and a gift recommendation service (GRS) 943. In some embodiments, the GRS 943 may be implemented as part of the machine learning service 971; in other embodiments, the GRS may be implemented as a separate service of the provider network as shown. Components of a given service may utilize components of other services in the depicted embodiment—e.g., for some machine learning tasks, a component of the machine learning service 971 may utilize virtual machines implemented at computing platforms such as 905A-905D of the virtualized computing service. Input data, intermediate results, final results and/or other artifacts of various machine learning algorithms or models may be stored at storage servers 925 (e.g., 925A-925D) of the database or storage service 923 in some embodiments. Individual ones of the services shown in FIG. 9 may implement a respective set of programmatic interfaces 977 which can be used by external and/or internal clients (where the internal clients may comprise components of other services) in the depicted embodiment.

As shown, the gift recommendation service 943 may comprise, among other components, one or more analysis workflow coordinators 947 in the depicted embodiment. An analysis coordinator 947 may, for example, invoke algorithms selected from the machine learning algorithm library 975 to train the various models required generate gift recommendations in the depicted embodiment. In some embodiments, requests to train machine learning models may be handled as batch jobs at the machine learning service, and a batch job scheduler 979 may orchestrate the allocation of resources for the jobs as well as dependencies among jobs. In some embodiments, the MLS 971 may comprise online/real-time analysis managers, e.g., to orchestrate small tasks, and such resources may be used to respond to some types of gift recommendation relates requests. In at least one embodiment, a machine learning service 971 may have access to or include a set of execution platforms 976 that are optimized for machine learning tasks (e.g., platforms that have customized hardware such as GPU arrays and/or customized software stacks). Depending on the suitability of such platforms for gift recommendation-related tasks, one or more execution platforms 976 may be employed in the depicted embodiment.

In at least some embodiments, the tasks of generating gift recommendations and accompanying explanations discussed earlier may be accomplished using non-specialized computing platforms of the virtualized computing service. In various embodiments, the training and test/evaluation data used for various models may be stored at a database/storage service 923. Techniques for gift recommendations and explanations described above may be implemented without acquiring resources of network-accessible services such as those shown in FIG. 9 in at least some embodiments. For example, a standalone tool implemented at one or more computing devices which are not part of a network-accessible service may be used in some embodiments.

Methods for Automated Generation of Gift Recommendations with Explanations

Figure 10:
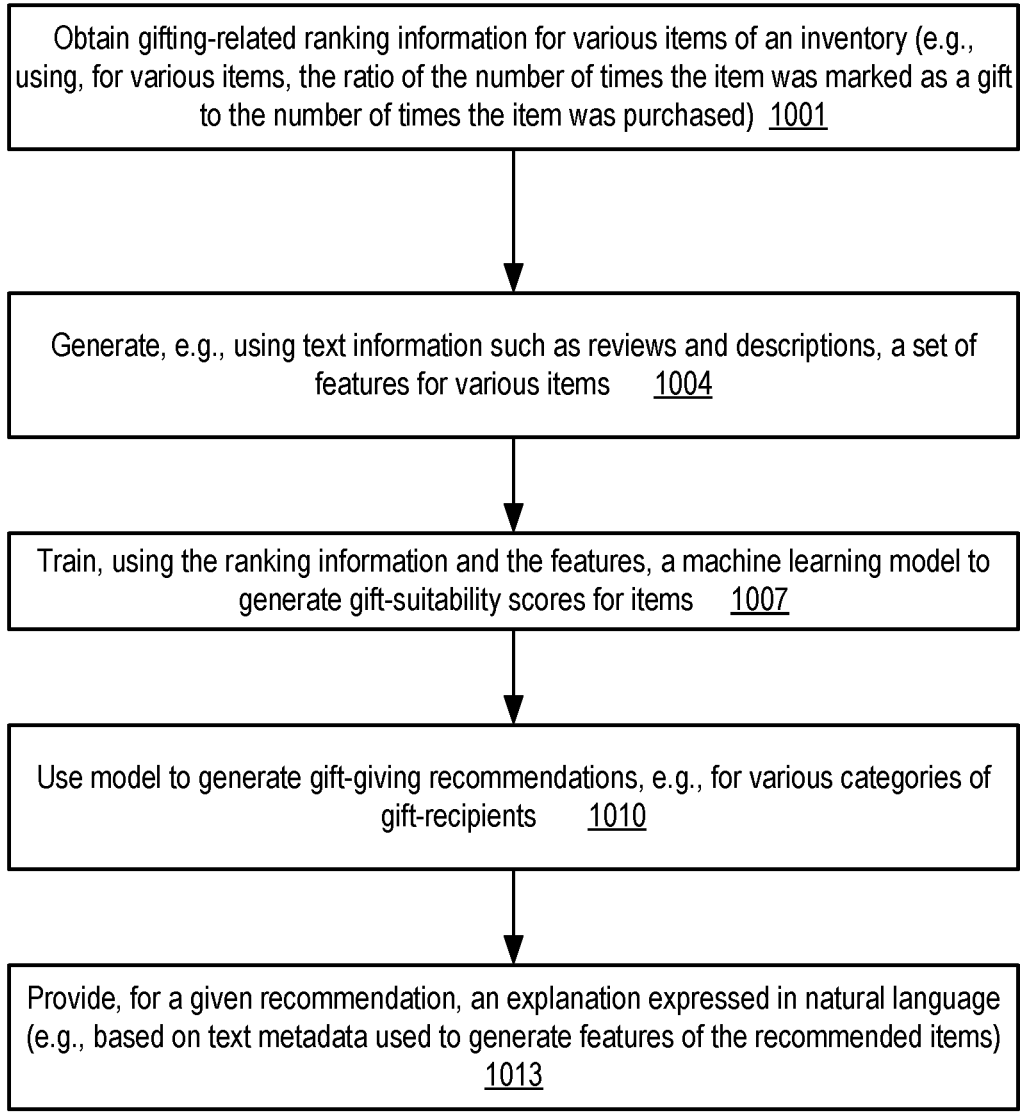
FIG. 10 is a flow diagram illustrating aspects of operations that may be performed to automatically generate gift recommendations with accompanying natural language explanations, according to at least some embodiments.

FIG. 10 is a flow diagram illustrating aspects of operations that may be performed to automatically generate gift recommendations with accompanying natural language explanations, according to at least some embodiments. A set of items from among which the subsets suitable for gifting to various categories of gift recipients may be identified. In some cases, the set of possible gifts to be analyzed for gift-suitability may comprise the entire inventory of an e-retailer or other establishment. In other cases, a subset of an inventory or catalog may be selected for gifting-related analysis—e.g., only those items which have been indicated as gifts during the purchase process (or for which there is other gifting-related evidence such as gift-wrapping requests) may be selected for analysis in some embodiments.

As shown in element 1001, gifting-related ranking information may be obtained for the items, e.g., using the ratios for individual items of the number of times the item shows evidence of having been given as a gifts to the total number of times the items was purchased during some recent time period. As mentioned earlier, in some embodiments, manually-curated gifting information and/or records of item returns may also or instead be used to generate the ranking information. Various types of ranking information may be obtained and considered for further analysis in different embodiments—e.g., pairwise ordinal information may be obtained in some embodiments, group-level ranking information may be obtained in other embodiments, and so on.

In addition to the ranking information, in at least some embodiments a set of comprising text collections pertaining to the items may be obtained and used for the gifting analysis. Such text collections may, for example, comprise user-generated content such as unstructured text reviews in some embodiments, and/or text collections provided by suppliers or producers of the items, such as descriptions and the like. Using at least the available text information, a respective set of features may be generated for various items in various embodiments (element 1004). In some embodiments, non-text information such as prices, sizes and the like may also be used to generate the feature sets. With respect to the features generated based on available text, any combination of a number of approaches may be taken in different embodiments. For example, in some embodiments, a feature of a particular item may be based at least in part on one or more of: (a) an occurrence count of an n-gram in a particular text collection associated with the particular item, (b) an embedding vector representing one or more words of a particular text collection, (c) sequencing information pertaining to a plurality of submitted text subsections of a particular text collection, (d) an indication that a particular text subsection of a particular text collection was submitted in response to another text subsection, (e) a character-level representation of at least a subsection of a particular text collection, or (f) a sentence level representation of at least a subsection of a particular text collection.

Using the feature sets and the ranking information, in at least some embodiments at least one machine learning model may be trained to generate gift-suitability scores for the various items (element 1007). In some embodiments, a linear model may be trained to predict the gift-suitability scores, while in other embodiments non-linear models such as neural-network-based models may be trained.

Using a trained version of the model(s), gift-giving recommendations may be generated, e.g., for various categories of gift recipients (element 1010). At least for some recommendations, which indicate that a particular item is a candidate for gifting, an explanation of why the particular item is predicted to be a good or successful gift, expressed in easy to understand natural language, may be provided together with the recommendation (element 1013). In some embodiments, portions or all of the text of a review or other text collection associated with the recommended item (or items similar to the recommended item) may be used to generate the explanation.

The gift recommendations may be provided in several different contexts, or in response to various kinds of programmatic requests, in various embodiments. In at least some embodiments, a recommendation may be provided in response to a request submitted by an individual looking for a suitable gift for someone. In some embodiments, gift-suitability based recommendations may be used to enhance an inventory, e.g., by adding new items that are expected (based on the analysis performed at a gift recommendation service) to sell well as gifts. The gift-suitability scores may also be used in some embodiments to re-arrange the items presented in a gifting guide, such as a gift selection page of an e-retail web site.

It is noted that in various embodiments, some of the operations shown in FIG. 10 may be implemented in a different order than that shown in the figure, or may be performed in parallel rather than sequentially. Additionally, some of the operations shown in FIG. 10 may not be required in one or more implementations.

Use Cases

The techniques described above, of analyzing available gifting-related information (such as records generated by customer interactions with an e-retailer and informational text collections (such as reviews) for various items of an inventory may be useful in a variety of scenarios. For many large and small retailing establishments, a non-trivial subset of the items sold may be purchased as gifts, e.g. for various seasonal occasions, birthdays and the like. The characteristics which make an item a good or successful gift may differ from at least some of the characteristics which may be useful for other retail success metrics. Using large numbers of records which may be generated at Internet-based retailing establishments, it may be possible to infer (at least to some level of success) the suitability of various items for gifts. Such records may be used to train machine learning models to predict gift-suitability scores for items, which in turn may be used to generate gift recommendations for various categories of gift recipients. Furthermore, in those environments where user-generated content such as reviews are available for the items, it may be possible to use portions of the user-generated content to provide at least some level of explanation or justification for why a particular item is being recommended as a gift. Providing such data-driven explanations may make the recommendations more believable, potentially leading to increased purchases of the recommended items.

Illustrative Computer System

Figure 11:
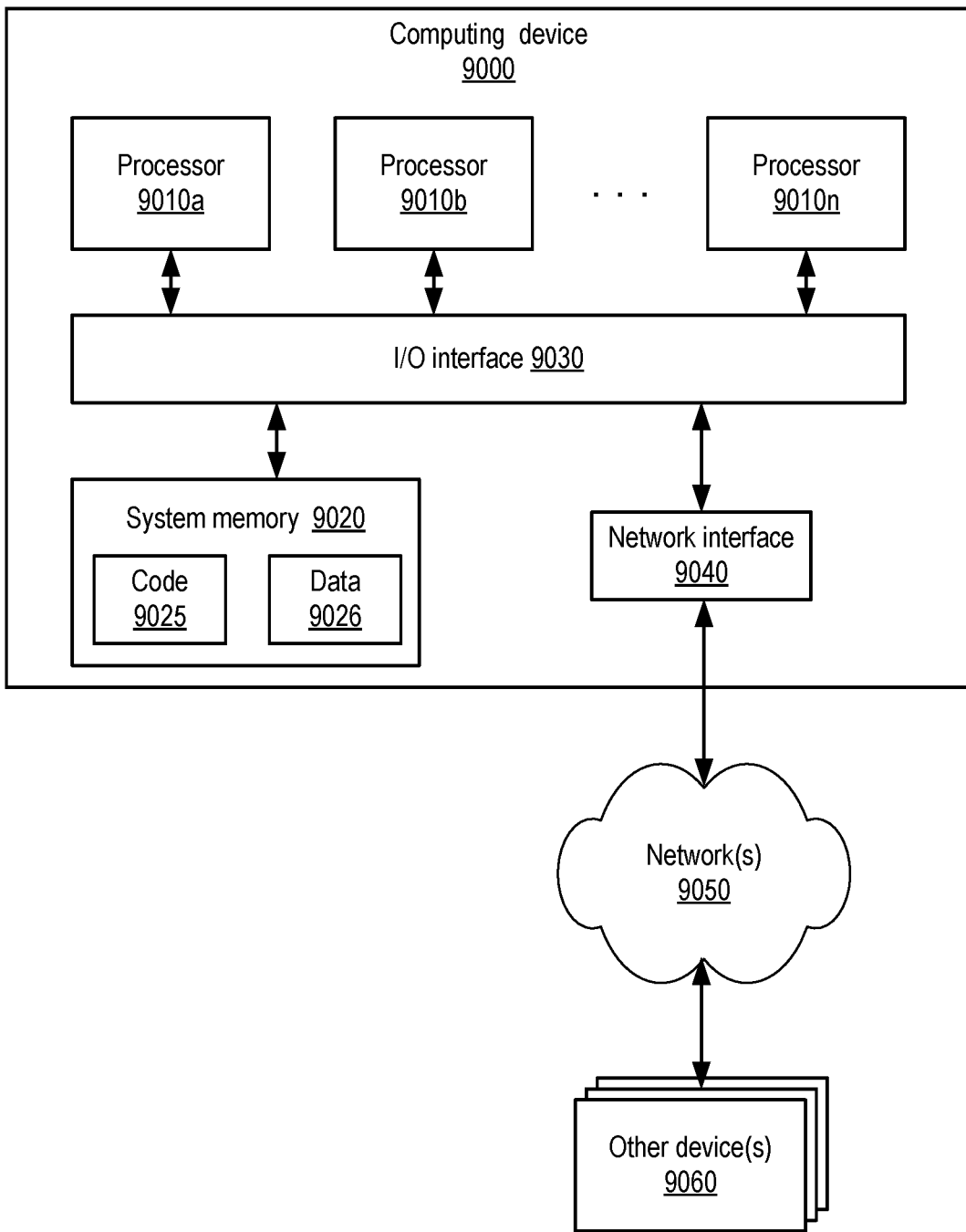
FIG. 11 is a block diagram illustrating an example computing device that may be used in at least some embodiments.

In at least some embodiments, a server that implements a portion or all of one or more of the technologies described herein, including the training and execution of machine learning models for gifting-related predictions and explanations, as well as various other components of a gift recommendation service or tool, may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices of an artificial intelligence service for gift recommendations;
   wherein the one or more computing devices are configured to:
   determine gifting-to-purchasing ratios for individual ones of a plurality of items based on a comparison of gifting records and purchase records associated with the individual ones of the plurality of items;
   obtain gifting-related ranking information pertaining to the plurality of items, based at least in part on the gifting-to-purchasing ratios for the individual ones of the plurality of items;
   generate, using a first data set comprising a plurality of text collections including one or more user-generated reviews of one or more items of the plurality of items, respective feature sets corresponding to individual items of the plurality of items;
   train, using at least the gifting-related ranking information and the respective feature sets, a first machine learning model to generate respective gift-suitability scores corresponding to individual items;
   generate, based at least in part on a particular gift-suitability score corresponding to a particular item, a gift-giving recommendation indicating the particular item as a candidate gift, wherein the particular gift-suitability score is obtained from a trained version of the first machine learning model; and
   provide the gift-giving recommendation and one or more recommendation explanations expressed in natural language.

2. The system as recited in claim 1, wherein to obtain the gifting-related ranking information, the one or more computing devices are configured to perform one or more of: (a) an execution of a regression model, (b) an execution of a classification model, (c) an analysis of records associated with a curated gifting guide, or (d) an analysis of records indicating returns of individual ones of the items.

3. The system as recited in claim 1, wherein a feature of a feature set of a particular item, derived from a particular text collection of the first data set is based at least in part on one or more of: (a) an occurrence count of an n-gram in the particular text collection, (b) an embedding vector representing one or more words of the particular text collection, (c) sequencing information pertaining to a plurality of submitted text subsections of the text collection, (d) an indication that a particular text subsection of the text collection was submitted in response to another text subsection, (e) a character-level representation of at least a subsection of the particular text collection, or (f) a sentence level representation of at least a subsection of the particular text collection.

4. The system as recited in claim 1, wherein the first machine learning model comprises a linear model, and wherein at least one recommendation explanation is based at least in part on a coefficient assigned to an input feature of the linear model, wherein the input feature comprises text.

5. The system as recited in claim 1, wherein the one or more computing devices are configured to:
   obtain the one or more recommendation explanations using a second machine learning model.

6. A method, comprising:
   performing, by one or more computing devices:
   determining respective gifting-to-purchasing ratios for individual ones of a plurality of items based on a comparison of gifting records and purchase records for the individual ones of the plurality of items;
   obtaining gifting-related ranking information pertaining to the plurality of items based at least in part on the respective gifting-to-purchasing ratios for individual ones of the plurality of items;
   training, using at least the gifting-related ranking information and respective feature sets corresponding to individual ones of the plurality of items, a first machine learning model to generate respective gift-suitability scores corresponding to individual items;
   generating, based at least in part on a particular gift-suitability score corresponding to a particular item, a gift-giving recommendation indicating the particular item as a candidate gift, wherein the particular gift-suitability score is obtained from the first machine learning model; and
   providing the gift-giving recommendation and one or more recommendation explanations expressed in natural language.

7. The method as recited in claim 6, wherein said gifting-related ranking information is based at least in part on one or more of: (a) a regression model, (b) a classification model, (c) analysis of a curated gifting guide, or (d) analysis of records of item returns.

8. The method as recited in claim 6, wherein at least some features of a feature set corresponding to the particular item are based at least in part on one or more text collections associated with the particular item.

9. The method as recited in claim 8, wherein a particular text collection associated with the particular item comprises one or more of: (a) a user-generated review or (b) item supplier-provided metadata.

10. The method as recited in claim 8, wherein a feature of a feature set of the particular item is based at least in part on one or more of: (a) an occurrence count of an n-gram in a particular text collection, (b) an embedding vector representing one or more words of a particular text collection, (c) sequencing information pertaining to a plurality of submitted text subsections of the text collection, (d) an indication that a particular text subsection of the text collection was submitted in response to another text subsection, (e) a character-level representation of at least a subsection of a particular text collection, or (f) a sentence level representation of at least a subsection of a particular text collection.

11. The method as recited in claim 6, wherein the first machine learning model comprises a linear model, and wherein at least one recommendation explanation is based at least in part on a coefficient assigned by the linear model to an input feature of the linear model, wherein the input feature comprises text.

12. The method as recited in claim 6, wherein the first machine learning model comprises a non-linear model.

13. The method as recited in claim 6, wherein the one or more recommendation explanations are obtained from a second machine learning model.

14. The method as recited in claim 6, wherein the gift-giving recommendation is provided in audio form by a voice-driven personal assistant device.

15. The method as recited in claim 6, further comprising performing, by the one or more computing devices:
   determining that a request for a gift-giving recommendation has been received via a programmatic interface, wherein said providing the gift-giving recommendation is responsive to the request.

16. A non-transitory computer-accessible storage medium storing program instructions that when executed on one or more processors cause the one or more processors to:
   determine respective gifting-to-purchasing ratios for individual ones of a plurality of items based on a comparison of gifting records and purchase records for the individual ones of the plurality of items;
   obtain gifting-related ranking information pertaining to the plurality of items based at least in part on the respective gifting-to-purchasing ratios for individual ones of the plurality of items;
   train, using at least the gifting-related ranking information and respective feature sets corresponding to individual ones of the plurality of items, a first machine learning model to generate respective gift-suitability scores corresponding to individual items;
   generate, based at least in part on a particular gift-suitability score corresponding to a particular item, a gift-giving recommendation indicating the particular item as a candidate gift, wherein the particular gift-suitability score is obtained from the first machine learning model; and
   provide the gift-giving recommendation and one or more recommendation explanations expressed in natural language.

17. The non-transitory computer-accessible storage medium as recited in claim 16, wherein at least some features of a feature set corresponding to the particular item are based at least in part on one or more text collections associated with the particular item.

18. The non-transitory computer-accessible storage medium as recited in claim 17, wherein a feature of a feature set of the particular item is based at least in part on one or more of: (a) an occurrence count of an n-gram in a particular text collection, (b) an embedding vector representing one or more words of a particular text collection, (c) sequencing information pertaining to a plurality of submitted text subsections of a particular text collection, (d) an indication that a particular text subsection of a particular text collection was submitted in response to another text subsection, (e) a character-level representation of at least a subsection of a particular text collection, or (f) a sentence level representation of at least a subsection of a particular text collection.

19. The non-transitory computer-accessible storage medium as recited in claim 16, wherein the first machine learning model comprises a linear model, and wherein at least one recommendation explanation is based at least in part on a coefficient assigned by the linear model to an input feature of the linear model, wherein the input feature comprises text.

20. The non-transitory computer-accessible storage medium storing program as recited in claim 16, wherein the instructions when executed on the one or more processors cause the one or more processors to:
   determine that a request for an inventory recommendation has been received via a programmatic interface; and
   identify, in response to the request, one or more items to be included in the inventory, wherein said identifying is based at least in part on respective scores indicated for the one or more items by the first machine learning model; and
   transmit an indication of the one or more items to a destination.

* * * * *